United States Patent
Crossman et al.

(10) Patent No.: US 12,448,146 B2
(45) Date of Patent: Oct. 21, 2025

(54) APPARATUS AND METHOD FOR COCKPIT DEPICTION OF OBSTACLE LOCATION

(71) Applicant: Aviation Communication & Surveillance Systems, LLC, Phoenix, AZ (US)

(72) Inventors: Jay Bryan Crossman, Phoenix, AZ (US); Paul Albert Voisin, Phoenix, AZ (US); Tyler Paul Hilt, Phoenix, AZ (US)

(73) Assignee: AVIATION COMMUNICATION & SURVEILLANCE SYSTEMS, LLC, Phoenix, AZ (US)

(*) Notice: Subject to any disclaimer, the term of this patent is extended or adjusted under 35 U.S.C. 154(b) by 140 days.

(21) Appl. No.: 18/139,227

(22) Filed: Apr. 25, 2023

(65) Prior Publication Data
US 2024/0359817 A1 Oct. 31, 2024

(51) Int. Cl.
*B64D 43/00* (2006.01)
*G08G 5/21* (2025.01)

(52) U.S. Cl.
CPC ............... *B64D 43/00* (2013.01); *G08G 5/21* (2025.01)

(58) Field of Classification Search
CPC ............................. B64D 43/00; G08G 5/0021
USPC ........................................................ 340/945
See application file for complete search history.

(56) References Cited

U.S. PATENT DOCUMENTS

| | | | |
|---|---|---|---|
| 5,359,326 A * | 10/1994 | Bivens | G01P 1/08 340/978 |
| 6,101,431 A * | 8/2000 | Niwa | G01S 17/933 345/9 |
| 7,330,147 B2 | 2/2008 | Khatwa | |
| 2004/0143393 A1 * | 7/2004 | Knecht | G08G 5/0021 340/961 |
| 2012/0075122 A1 * | 3/2012 | Whitlow | B64D 45/0056 340/963 |
| 2018/0293903 A1 | 10/2018 | Gadgil et al. | |
| 2019/0019423 A1 * | 1/2019 | Choi | G05D 1/106 |
| 2019/0122570 A1 * | 4/2019 | Flotte | G05B 15/02 |
| 2020/0020239 A1 * | 1/2020 | Chen | G08G 5/0021 |
| 2022/0398930 A1 * | 12/2022 | Plantinga | G08G 5/0086 |

FOREIGN PATENT DOCUMENTS

EP 2672289 12/2013

OTHER PUBLICATIONS

Notification of Transmittal of the International Search Report and the Written Opinion of the International Searching Authority, or the Declaration, dated Sep. 23, 2024 (Sep. 23, 2024), 14 pages, issued on related International Patent Application PCT/US2024/025419, by the European Patent Office.

* cited by examiner

*Primary Examiner* — Kerri L McNally
(74) *Attorney, Agent, or Firm* — DICKINSON WRIGHT PLLC

(57) ABSTRACT

A system and method of alerting a pilot of an aircraft are provided. The method includes obtaining a track list of detected objects; for each detected object, determining a first alert factor based on a rate of closure to the aircraft and determining a second alert factor based on an azimuth. An alert list is created including each of the detected objects along with its corresponding first and second alert factors. The alert list is ordered in an order of priority, and the alerts are displayed on a light bar disposed in a cockpit of the aircraft.

30 Claims, 6 Drawing Sheets

APPARATUS AND METHOD FOR COCKPIT DEPICTION OF OBSTACLE LOCATION

BACKGROUND

1. Field

Apparatuses and methods consistent with example embodiments relate to cockpit depiction of obstacle location and, more specifically, to apparatuses and methods for visual depiction of obstacle location on a light bar.

2. Description of the Related Art

In a helicopter or other aircraft, a traffic display provides a visual depiction of the location of other aircraft in a vicinity around an own aircraft. However, ground-based obstacles, such as wires, towers, buildings, or trees, or other obstacles, such as drones are not indicated on such displays. In situations in which an aircraft is flying at a relatively low altitude relative to terrain, such as when landing on a highway or a landing pad on the ground or a low building, awareness of such obstacles is of particular importance.

Of particular benefit would be a visual cockpit indication to depict this information to the pilot in a simple and straightforward way that does not pose a distraction or require a large amount of time to process.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment a method of alerting a pilot of an aircraft comprises: obtaining a track list of a plurality of detected objects; creating an alert list of a plurality of alerts, each alert comprising a corresponding one of the plurality of detected objects; and displaying the plurality of alerts on a light bar disposed in a cockpit of the aircraft.

The method may further comprise: determining, for each of the plurality of detected objects, at least one alert factor, wherein each alert of the plurality of alerts comprises the corresponding one of the plurality of detected objects and a corresponding alert factor.

The at least one alert factor may comprise: a first alert factor based on a determined urgency of threat, and a second alert factor based on a relative location with respect to the aircraft; and each alert of the plurality of alerts comprises the corresponding one of the plurality of detected objects, a corresponding first alert factor, and a corresponding second alert factor.

The method may further comprise: ordering the plurality of alerts in an order of priority; wherein the displaying the plurality of alerts comprises displaying the plurality of alerts in an order from a lowest priority to a highest priority, such that an alert with a higher priority is displayed over an alert with a lower priority.

The determining the first alert factor may comprise determining the urgency of threat based on a rate of closure to the aircraft; and the determining the second alert factor comprises determining the relative location with respect to the aircraft based on azimuth.

The track list of detected objects may comprise, for each of the plurality of detected objects, a longitude, a latitude, and an altitude.

The first alert factor may be a display color.

The determining the first alert factor may comprise determining one of: a color green based on the rate of closure being below a first rate threshold; a color yellow based on the rate of closure being between the first rate threshold and a second rate threshold; and a color red based on the rate of closure being higher than the second rate threshold, wherein the second rate threshold is higher than the first rate threshold.

The first alert factor may be a brightness.

The second alert factor may be a display width.

The second alert factor may be a display width, and the determining the second alert factor may comprise determining the display width as directly corresponding to the azimuth.

The second alert factor may be a display width; and the determining the second alert factor may comprise determining one of: a first display width based on the azimuth being less than an azimuth threshold; and a second, variable, display width corresponding to the azimuth based on the azimuth being greater than the azimuth threshold.

The method may further comprise, for each of the plurality of detected objects, determining a third alert factor, wherein the third alert factor is a display brightness based on a range to the aircraft.

The at least one alert factor may comprise: a first alert factor based on a determined urgency of threat, and a second alert factor based on a relative location with respect to the aircraft; each alert of the plurality of alerts comprises the corresponding one of the plurality of detected objects, a corresponding first alert factor, and a corresponding second alert factor; and the ordering the plurality of alerts in the order of priority comprises ordering the plurality of alerts by the first display factor, and within each of a plurality of first display factor categories, ordering one or more of the plurality of alerts based on a range of a corresponding object to the aircraft.

The obtaining the track list may comprise: detecting information of the plurality of detected objects; obtaining information of the aircraft; for each of the plurality of detected objects: determining a relative location of the detected object with respect to the aircraft, and comparing the information of the detected object with information of each of a plurality of previously-known objects; and creating the track list by including each of the previously-known objects and adding information of a detected object to an entry in the track list for a previously-known track list or newly adding a detected object to the track list.

According to an aspect of another example embodiment, an obstacle indication system for an aircraft comprises: an addressable light bar comprising a plurality of light units and a driver; a memory storing software instructions; and a processor configured to execute the software instructions to thereby: obtain a track list of a plurality of detected objects; create an alert list of a plurality of alerts, each alert comprising a corresponding of the plurality of detected objects; and control the driver of the light bar to display the plurality of alerts.

The processor may be further configured to: determine, for each of the plurality of detected objects, at least one alert factor, wherein each alert of the plurality of alerts comprises the corresponding one of the plurality of detected objects and a corresponding alert factor.

The at least one alert factor may comprise: a first alert factor based on a determined urgency of threat, and a second alert factor based on a relative location with respect to the aircraft; and each alert of the plurality of alerts comprises the corresponding one of the plurality of detected objects, a corresponding first alert factor, and a corresponding second alert factor.

The processor may be configured to: order the plurality of alerts in an order of priority; and display the plurality of alerts by displaying the plurality of alerts in an order from a lowest priority to a highest priority, such that an alert with a higher priority is displayed over an alert with a lower priority.

The processor may be configured to determine the first alert factor by determining the urgency of threat based on a rate of closure to the aircraft; and the processor is configured to determine the second alert factor by determining the relative location with respect to the aircraft based on azimuth.

The memory and the processor may be disposed within a housing of the light bar.

Each of the plurality of light units may comprise at least one light emitting diode (LED). The driver may comprise a light emitting diode (LED) driver.

The track list of detected objects may comprise, for each of the plurality of detected objects, a longitude, a latitude, and an altitude.

The first alert factor may be a display color.

The processor may be configured to determine the first alert factor by determining: a color green based on the rate of closure being below a first rate threshold; a color yellow based on the rate of closure being between the first rate threshold and a second rate threshold; and a color red based on the rate of closure being higher than the second rate threshold, wherein the second rate threshold is higher than the first rate threshold.

The first alert factor may be a brightness.

The second alert factor may be a display width.

The processor may be configured to determine the second alert factor by determining the display width as directly corresponding to the azimuth.

The processor may be configured to determine the second alert factor by determining one of: a first display width based on the azimuth being less than an azimuth threshold; and a second, variable, display width corresponding to the azimuth based on the azimuth being greater than the azimuth threshold.

The processor may be further configured to determine, for each of the plurality of detected objects, a third alert factor, wherein the third alert factor is a display brightness based on a range to the aircraft.

The processor may be configured to order the plurality of alerts in the order of priority by ordering the plurality of alerts by the first display factor, and within each of a plurality of first display factor categories, ordering one or more of the plurality of alerts based on a range of a corresponding object to the aircraft.

The processor may be configured to obtain the track list by: detecting information of the plurality of detected objects; obtaining information of the aircraft; for each of the plurality of detected objects: determining a relative location of the detected object with respect to the aircraft, and comparing the information of the detected object with information of each of a plurality of previously-known objects; and creating the track list by including each of the previously-known objects and adding information of a detected object to an entry in the track list for a previously-known track list or newly adding a detected object to the track list.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1A:
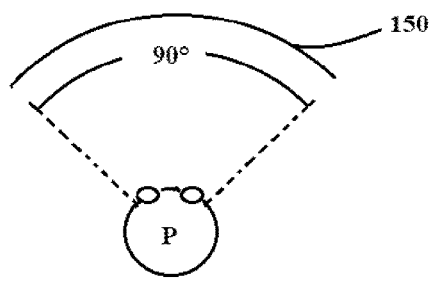
FIGS. 1A, 1B, and 1C illustrate possible example embodiments in which a light bar extends through 90 degrees, 180 degrees, and 360 degrees, respectively, of a pilot's viewpoint.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including," "comprise," and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

The current cooperative radio baseline is that the pilot can see other traffic in the area based on the transponders of the other aircraft. Those other aircraft typically show up on the pilot's traffic display as cooperative traffic. However, other possible obstacles, such as local terrain, things on the ground such as trees, wires, antenna, posts, or other elements such as drones (e.g. for use in aerial videography, are not shown. When a pilot is landing or is flying close to the ground, there is a good chance that it is important for the pilot to be aware of these possible obstacles. For this purpose, the traffic display is not useful.

It is desired to be able to use information of the surrounds, the terrain, and other possible obstacles that are sensed by sensors on the aircraft, and depict this information in a relevant human-machine interface.

In a radar-like display in which an aircraft is depicted in a central location, and potential obstacles are displayed therearound, there is an angle at which an obstacle is displayed.

When a potential obstacle comes within a particular threshold distance of the aircraft, it is displayed at an angle corresponding to the location of the potential obstacle with respect to the heading of the aircraft.

Depending on the width of the potential obstacle from the viewpoint of the sensors, when the potential obstacle is within another threshold distance, the obstacle is displayed as a wedge, fanning out from the location of the aircraft, thus displaying the obstacle's azimuth.

This information is translated into information displayed on a light bar with the azimuth (relative direction) and the range of each potential obstacle represented in light. The azimuth of the potential obstacle is represented by the location of a light indication on the light bar. The range or altitude differential, or a combination thereof of the potential obstacle can be represented by any one or more of the color, brightness, color oscillation, and flashing pattern of the indication.

Figure 1B:
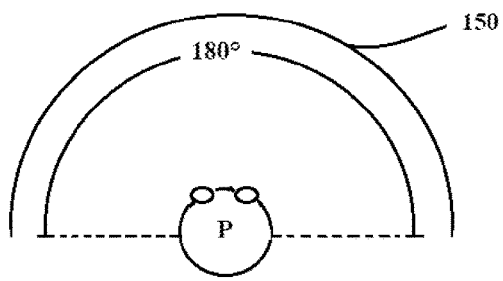
Figure 1C:
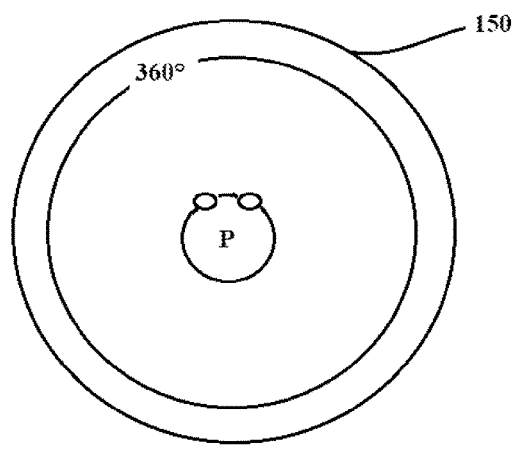

The length of the light bar may be limited to extending over only a certain number of degrees of the pilot's viewpoint, for example 90 degrees, or may extend over 180 or a full 360 degrees of the pilot's viewpoint. FIGS. 1A, 1B, and 1C illustrate possible example embodiments in which the light bar 150 extends through 90 degrees, 180 degrees, and 360 degrees of the pilot's viewpoint, respectively. Regardless of the actual degrees of the pilot's viewpoint over which the light bar extends, the actual degrees of display utilized and over which light indications are shown may be smaller than the entirety of the length of the light bar. For example, the degrees of display may vary depending on the airspeed of the aircraft, with, for example a narrower range of degrees being used for display when the aircraft has a high airspeed, and a wider range of degrees being used for display when the aircraft has a lower airspeed.

Figure 2:
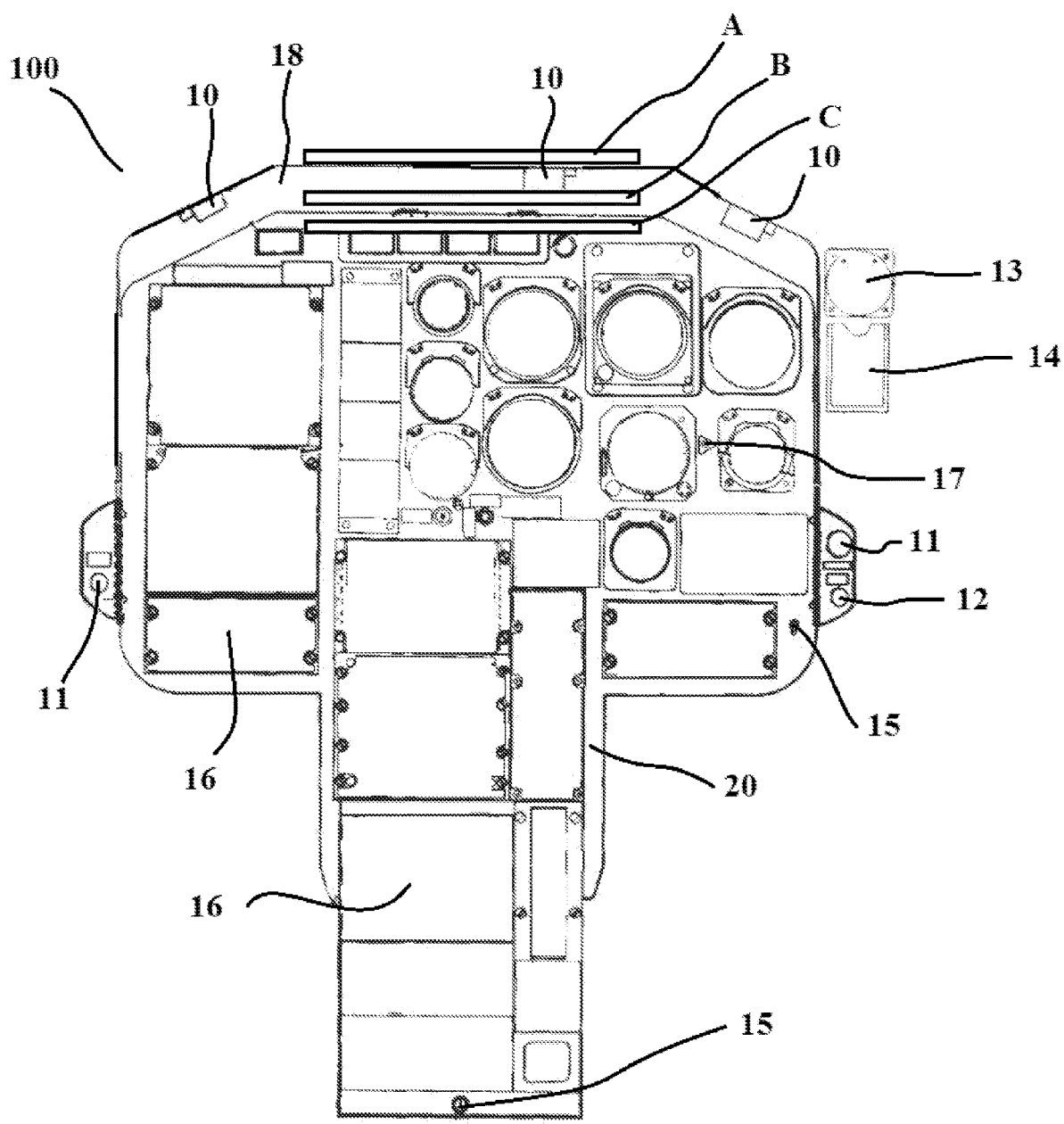
FIG. 2 illustrates a helicopter cockpit according to an example embodiment.

FIG. 2 illustrates a helicopter cockpit 100 including, but not limited to navigation (NVG) flood lights 10; defog pulls 11; a vent pull 12; a magnetic compass 13; a compass card holder 14; an instrument panel 20 including any of a variety of switches 15, panels 16, and indicators 17; and a visor 18.

According to an example embodiment, an obstacle indication system 200 includes a light bar 150 positioned in an aircraft cockpit, for example helicopter cockpit 100, in a position from which the light bar 150 can be easily seen by the pilot. For example, the light bar 150 may be positioned directly in front of the pilot in any of a variety of positions, including, but not limited to along a top of a visor, shown as position A in FIG. 2, on a visor, shown as position B in FIG. 2, on top of an instrument panel, shown as position C in FIG. 2. Alternately, the light strip may be mounted directly to the windscreen. The light strip may be mounted to its location in the cockpit using any of a number of attachment mechanisms, such as adhesive, hook and loop attachments, zip ties, straps, clips etc.

FIGS. 1a, 1b, and 1c illustrate example ranges of a light bar as positioned in a cockpit, according to example embodiments. As shown in FIGS. 1a, 1b, and 1c, showing a pilot's position and viewpoint as P, a light bar 150 according to an example embodiment could extend over a range of about 90°, or about 180°, or entirely around the pilot in a range of about 360°, respectively. Of course, a light bar 150 according to one of more example embodiments could extend over any range, as would be understood by one of skill in the art.

Figure 3:
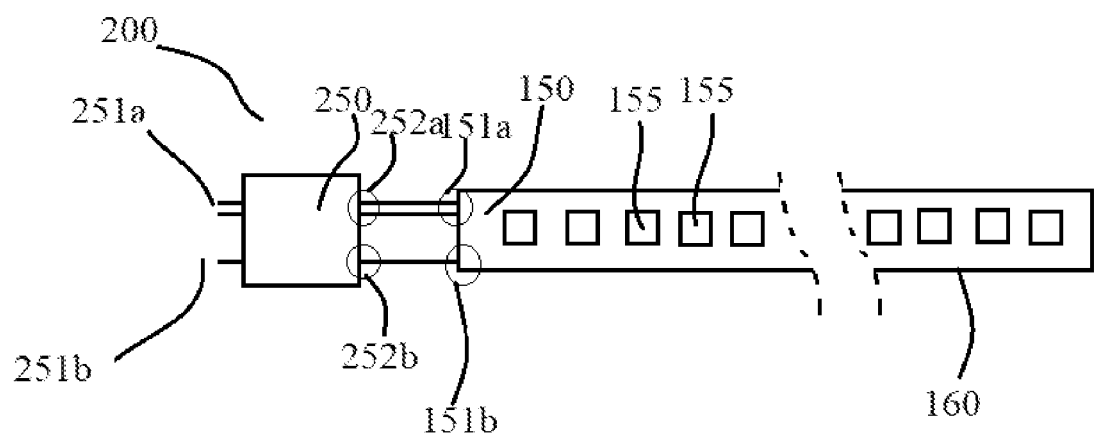
FIG. 3 is a diagram of an obstacle indication system according to an example embodiment.

FIG. 3 is a diagram of an obstacle indication system 200 according to an example embodiment. The system 200 includes an addressable light bar 150 including a plurality of light units 155, and a processor 250, operatively coupled to the light bar 150. The light bar 150 includes a housing 160, which houses the light units 155 therein, and the processor 250 may be a separate unit, external to the light bar 150, as shown in FIG. 3. Alternately, the processor 250 may be disposed within the housing 160 of the light bar 150. The light bar includes a power port 151a and a data port 151b each configured to be operatively connected to the processor 250, in an embodiment in which the processor is external to the light bar 150, or, in an embodiment in which the processor is disposed within the housing 160, to be connected to one or more electronic elements within the aircraft. The processor includes a power port 251a and a data port 251b, each configured to be operatively connected to one or more electronic elements within the aircraft, and includes a power port 252a and a data port 152b, configured to be operatively connected to the power port 151a and the data port 151b, respectively, of the light bar. Alternately, in an embodiment in which the processor is disposed within the light bar, the power and data ports 252a and 252b of the processor may be connected to one or more elements internal to the light bar, as discussed in greater detail below.

Figure 4:
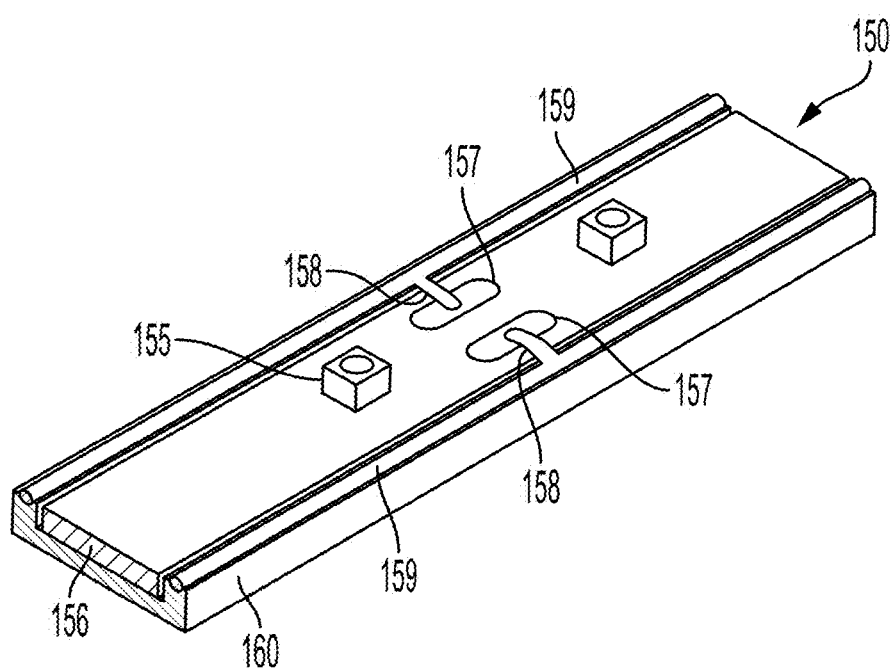
FIG. 4 is a diagram of a light bar according to an example embodiment.

FIG. 4 is a diagram of a light bar 150 according to an example embodiment. The light bar includes a protective housing or covering 160, and a plurality of light units 155, disposed on a substrate 156, which emit light when electrical power is distributed thereto. The housing 160, and thus the light bar 150 may be flexible. The substrate 156 may be a non-conductive substrate including a plurality of conductive traces, such as a printed circuit board (PCB) or a printed wiring board (PWB). The light units 155 may be equidistantly spaced apart or may be spaced apart at different intervals. The traces within the substrate 156 include electrical connectors for electrically connecting to a power source, and a plurality of contacts 157 are electrically connected, via contacts 158, to a power bus 159, for example, a conductive wire, which runs a length of the light bar 150.

Each light unit 155 may be connected to a driver chip (not shown) disposed on the substrate 156 and connected, via conductive traces, to the power port 151a and the data port 151b. The light units 155 may each comprise an LED, and the driver chips may be LED driver chips.

Figure 5:
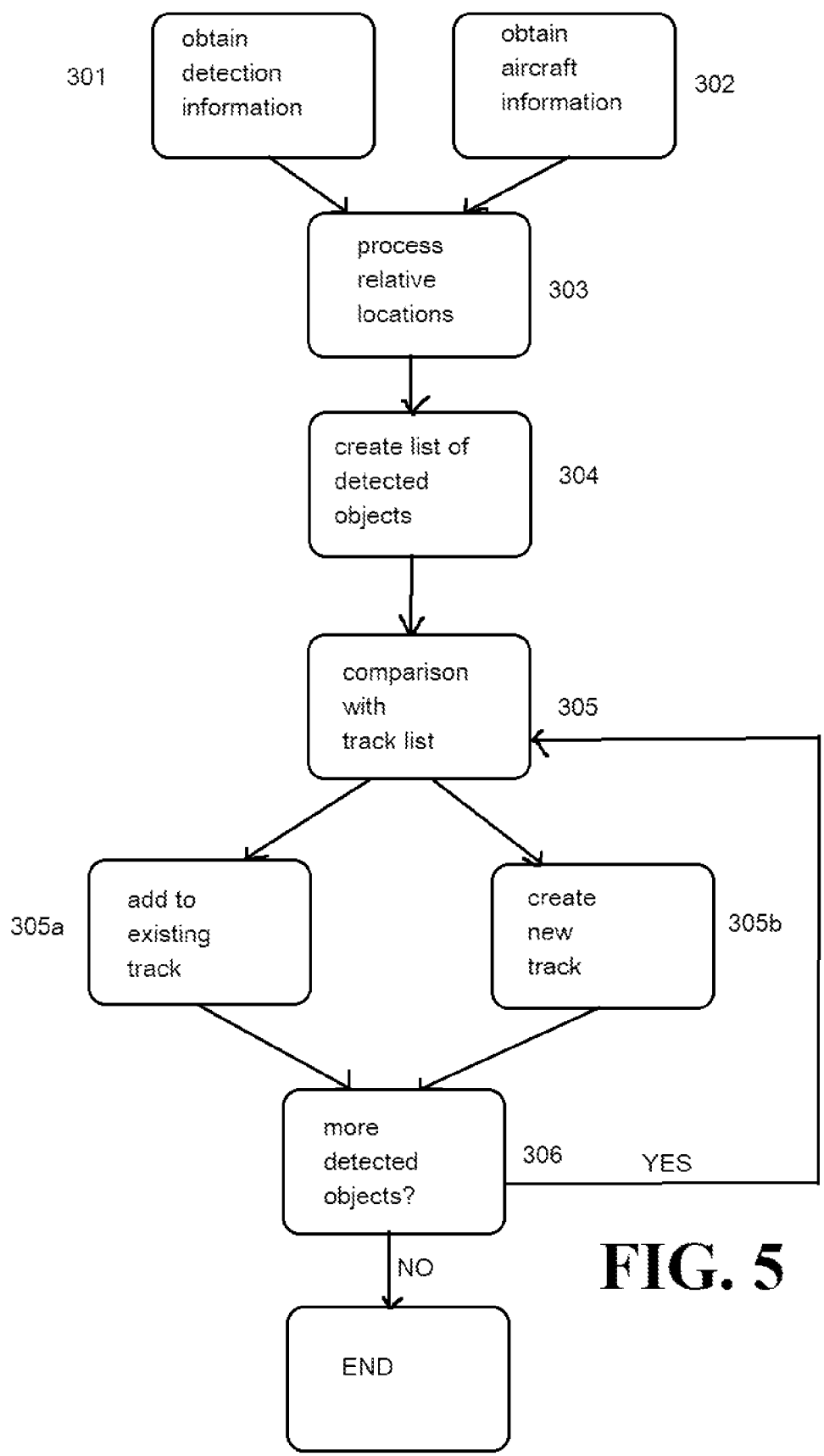
FIG. 5 shows a flowchart of a method of detecting and processing information used to display information on a light bar according to an example embodiment.

FIG. 5 shows a flowchart including example operations of detecting and processing information used to display information on a light bar according to one or more example embodiments. Information of detected objects is obtained at 301. This information may be obtained from sensors, such as radar detectors and/or Lidar, existing on the aircraft, or from another aircraft's TCAS system. Aircraft information, such as latitude, longitude, and altitude of the aircraft is obtained at 302. This may be obtained from a global positioning sensor (GPS) device. Alternately, information may be obtained from the aircraft's Flight Management System (FMS). At 303, the information of the detected objects and information of the aircraft is processed, e.g. by processor 250 or al alternate onboard processor, to identify locations of the detected objects relative to the aircraft. At 304, information of the detected objects is stored in a list, along with information of each detected object, such as, but not limited to the object's distance to the aircraft with respect to latitude and longitude, and the object's altitude relative to that of the aircraft. Information of each detected object may also include a predicted direction and/or course of the object, and a velocity of the object.

At 305, a comparison between a location of a detected object in the list and a location of each track already included in an existing track list. If a distance between the location of a detected object and a location of an existing track is less than a threshold distance, for example, but not limited to a threshold of 12 meter radius horizontally and/or 10 meters vertically, information of the detected object is added to information of the existing track in the track list at 305*a*. If a distance between the location of a detected object and locations of every existing track in the track list is greater than the threshold distance, information of the detected object is used to create a new track in the track list at 305*b*.

If there are more detected objects in the list, 306—YES, the procedure repeats 305 with each detected object. If operations 305 have been conducted with each detected object in the list, 306—NO, the detection operations end.

Figure 6:
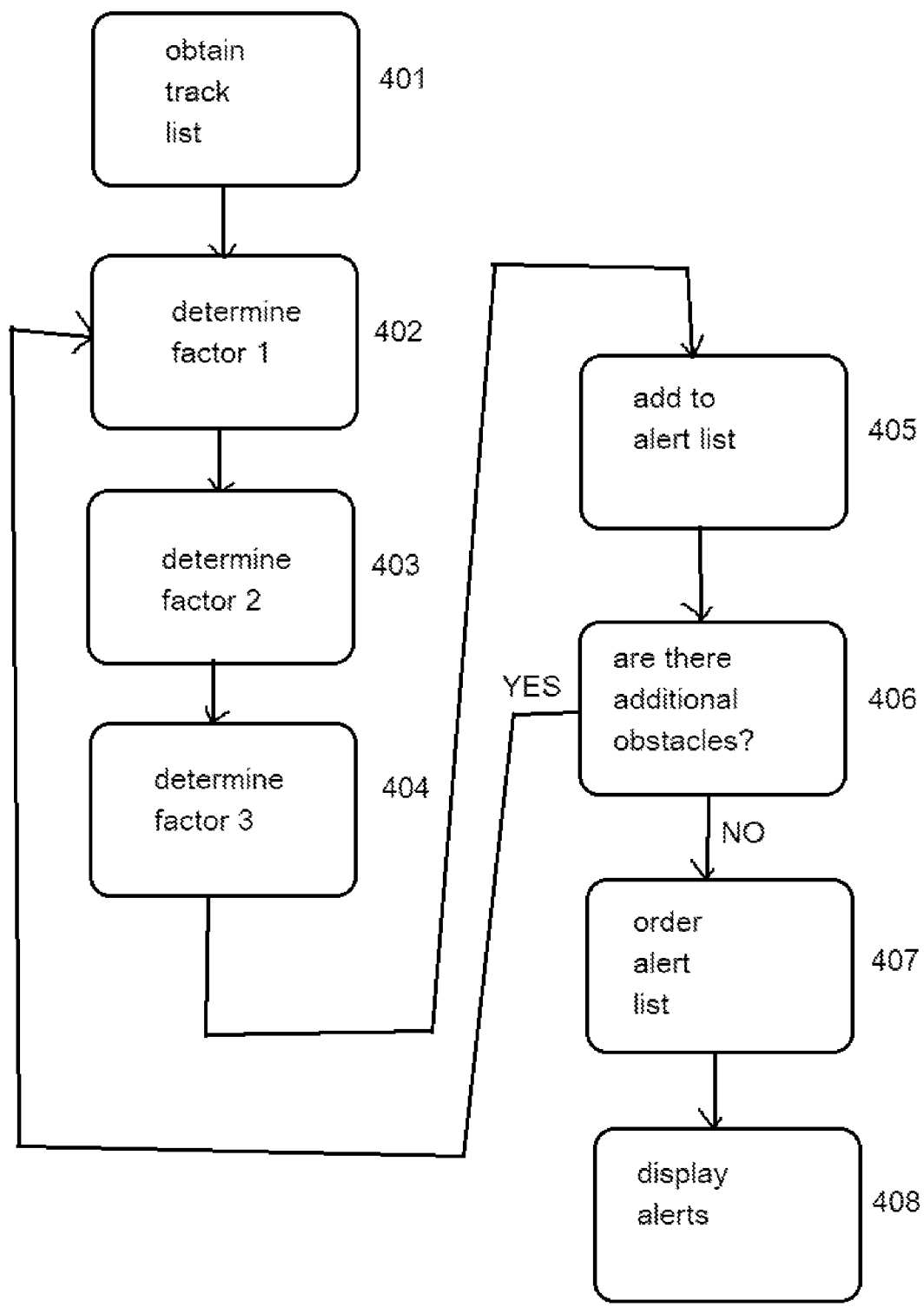
FIG. 6 shows a flowchart of a method of using information included in a track list to alert a pilot via a light bar according to an example embodiment.

FIG. 6 shows a flowchart including example operations of using information included in the track list to alert a pilot via a light bar 150 according to one or more example embodiments. A track list of tracks/detected objects, each including information of at least a latitude, longitude, and altitude of a detected object, is obtained. This track list may be obtained according to the operations described above with respect to FIG. 5, or may be obtained from any existing sensor(s) or processor(s) existing within the aircraft, as would be understood by one of skill in the art. For each object in the track list, a first alert factor is determined based on information in the track list, at 402. For example, a first alert factor may be a display color of the alert which may be determined, for example, based on a rate of closure between the aircraft and the detected object. Thus, for example, an object with a rate of closure above a high threshold rate may be assigned a red display color; an object with a rate of closure between a high threshold and a low threshold rate may be assigned a yellow display color; and an object with a rate of closure below a low threshold rate may be assigned a green display color. Of course these colors are merely examples and may be any of various colors displayable on the light bar. Additionally, the first alert factor may be a different factor, such as, but not limited to a brightness of the alert, and a flashing pattern of the alert.

For each object on the track list, a second alert factor is determined based on information in the track list, at 403. For example, a second alert factor may be a width of the display which may be determined, for example, by an azimuth over which the object has been detected. Thus, for example, for a light bar which extends about 360° around the pilot in a substantially full circle, an a determined width of an alert corresponding to the object may correspond to the actual azimuth over which the object has been detected. For a light bar which extends over less than 360° around the pilot, a width of an alert may correspond to a fraction of the actual azimuth over which the object has been detected. Alternately, for a light bar which extends over less than 360° around the pilot, a width of an alert may be a small, fixed width for an object with an actual azimuth of less than a predetermined threshold; and a width of an alert may vary based on the actual azimuth of an object for objects with an actual azimuth larger than the predetermined threshold.

For each object on the track list, a third alert factor may be determined based on information in the track list, at 404. The determination, and display, of this third alert factor is optional and may be omitted. For example, a third alert factor may be a display brightness of the alert which may be determined, for example, based on a range of the object to the aircraft. Thus, for example, an object with a range to the aircraft which is greater than a threshold range may be assigned a low brightness, and an object with a range to the aircraft less than the threshold range may be assigned a high brightness. Of course a number of brightness levels greater than two may be used, and the third alert factor may be a different factor, such as, but not limited to a flashing pattern and a color.

Once all alert factors are determined for a track/detected object, the track/detected object and all corresponding alert factors are added to an alert list at 405. If there are more tracks/detected objects in the track list, 406—YES, the procedure repeats 402-405 with each remaining track/detected object. If operations 402-405 have been conducted with respect to each track/detected object in the track list, 406—NO, the alert list is ordered at 407. The alerts in the alert list are placed in order of lowest priority to highest priority, with priority determined, for example, based on the first factor, e.g. rate of closure to the aircraft, and then, within each color, based on a range within each first factor. In other words, for example, the alert list includes all tracks/detected objects assigned a green color, then all tracks/detected objects assigned a yellow color, and then all tracks/detected objects assigned a red color; and within each color, the individual tracks/detected objects are ordered from closest range to farthest range.

Once ordered, the alerts in the alert list are displayed on the light bar, in order, from back to front, at 408. In other words, the alerts with the lowest priority are displayed "behind" those with the highest priority, such that in a case in which any two alerts would overlap on the light bar, the alert with the higher priority is shown in the overlapping area and the alert with the lower priority is "hidden" in the overlapping area. In order to display the alerts on the light bar, the information in the alert list is transmitted to the light bar where software stored on a microcontroller maps the information to the pixels of the light bar.

According to one or more alternate embodiments, the light bar and algorithm controlling the light bar may be implemented as an application operating within a multifunction display (MFD). For example, the light bar could be represented using rows of pixels across a top or bottom of the display when mode dictates—for example, twenty rows of pixels. The methodology would be analogous to that described above, while using an LCD display rather than an LED light bar.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A method of alerting a pilot of an aircraft, the method comprising:
obtaining a track list of a plurality of objects, wherein the obtaining the track list comprises:
detecting information of at least one detected object,
for each of the at least one detected object, comparing information of the detected object with information of at least one previously-known object, and
creating the track list by including the at least one previously-known object and the at least one detected object or newly adding the at least one detected object to a previously-created track list;
creating an alert list of a plurality of alerts, each alert comprising a corresponding one of the plurality of objects of the track list; and
displaying the plurality of alerts on a light bar disposed in a cockpit of the aircraft.

2. The method according to claim 1, further comprising:
determining, for each of the plurality of objects in the track list, at least one alert factor, wherein each alert of the plurality of alerts comprises the corresponding one of the plurality of objects and a corresponding alert factor.

3. The method according to claim 2, wherein:
the at least one alert factor comprises:
a first alert factor based on a determined urgency of threat, and
a second alert factor based on a relative location with respect to the aircraft; and
each alert of the plurality of alerts comprises the corresponding one of the plurality of objects, a corresponding first alert factor, and a corresponding second alert factor.

4. A method of alerting a pilot of an aircraft, the method comprising:
obtaining a track list of a plurality of objects;
creating an alert list of a plurality of alerts, each alert comprising a corresponding one of the plurality of objects;
ordering the plurality of alerts in an order of priority; and
displaying the plurality of alerts on a light bar disposed in a cockpit of the aircraft,
wherein the displaying the plurality of alerts comprises displaying the plurality of alerts in an order from a lowest priority to a highest priority, such that, in a case in which any two or more alerts would overlap on the light bar, an alert with a higher priority is displayed in an overlapping area and an alert with a lower priority is hidden in the overlapping area.

5. A method of alerting a pilot of an aircraft, the method comprising:
obtaining a track list of a plurality of objects;
creating an alert list of a plurality of alerts, each alert comprising a corresponding one of the plurality of objects;
determining, for each of the plurality of objects in the track list, an alert factor by determining a relative location with respect to the aircraft based on azimuth, wherein each of the plurality of alerts comprises the corresponding one of the plurality of objects and the corresponding alert factor; and
displaying the plurality of alerts on a light bar disposed in a cockpit of the aircraft;
wherein the alert factor is a display width, and the determining the alert factor comprises determining the display width as directly corresponding to the azimuth.

6. The method according to claim 1, wherein the track list of objects comprises, for each of the plurality of detected objects, a longitude, a latitude, and an altitude.

7. The method according to claim 5, wherein the alert factor is a display color, and the displaying the plurality of alerts comprises displaying each of the plurality of alerts according to the corresponding alert factor.

8. The method according to claim 2, wherein the determining the at least one alert factor comprises determining one of:
a color green based on a rate of closure to the aircraft being below a first rate threshold;
a color yellow based on the rate of closure being between the first rate threshold and a second rate threshold; and
a color red based on the rate of closure being higher than the second rate threshold,
wherein the second rate threshold is higher than the first rate threshold.

9. The method according to claim 2, wherein the at least one alert factor is a brightness.

10. The method according to claim 2, wherein the at least one alert factor is a display width.

11. The method according to claim 5, wherein:
the alert factor is a display width; and
the determining the alert factor comprises determining one of:
a first display width based on the azimuth being less than an azimuth threshold; and
a second, variable, display width corresponding to the azimuth based on the azimuth being greater than the azimuth threshold.

12. The method according to claim 2, wherein the at least one alert factor is a display brightness, and the determining the at least one alert factor comprises determining the display brightness based on a range to the aircraft.

13. The method according to claim 2, wherein:
the at least one alert factor comprises:
a first alert factor based on a determined urgency of threat, and
a second alert factor based on a relative location with respect to the aircraft;
wherein each alert of the plurality of alerts comprises the corresponding one of the plurality of objects, a corresponding first alert factor, and a corresponding second alert factor; and
the method further comprises:
ordering the plurality of alerts in an order of priority based on the first alert factor, and within each of a plurality of first display factor categories, ordering one or more of the plurality of alerts based on a range of a corresponding object to the aircraft.

14. An obstacle indication system for an aircraft, the obstacle indication system comprising:
an addressable light bar comprising a plurality of light units and a driver;
a memory storing software instructions; and
a processor configured to execute the software instructions to thereby:
obtain a track list of a plurality of objects, wherein the obtaining the track list comprises:
detecting information of at least one detected object,
for each of the at least one detected object, comparing information of the detected object with information of at least one previously-known object, and creating the track list by including the at least one previously-known object and the at least one detected object or newly adding the at least one detected object to a previously-created track list;

create an alert list of a plurality of alerts, each alert comprising a corresponding of the plurality of detected objects; and control the driver of the light bar to display the plurality of alerts.

15. The obstacle indication system according to claim 14, wherein the processor is further configured to:

determine, for each of the plurality of objects in the track list, at least one alert factor, wherein each alert of the plurality of alerts comprises the corresponding one of the plurality of objects and a corresponding alert factor.

16. The obstacle indication system according to claim 15, wherein:

the at least one alert factor comprises:
a first alert factor based on a determined urgency of threat, and
a second alert factor based on a relative location with respect to the aircraft; and each alert of the plurality of alerts comprises the corresponding one of the plurality of objects, a corresponding first alert factor, and a corresponding second alert factor.

17. An obstacle indication system for an aircraft, the obstacle indication system comprising:

an addressable light bar comprising a plurality of light units and a driver;
a memory storing software instructions; and
a processor configured to execute the software instructions to thereby:
obtain a track list of a plurality of objects;
create an alert list of a plurality of alerts, each alert comprising a corresponding of the plurality of objects;
order the plurality of alerts in an order of priority; and
control the driver of the light bar to display the plurality of alerts in an order from a lowest priority to a highest priority, such that, in a case in which any two or more alerts would overlap on the light bar, an alert with a higher priority is displayed in an overlapping area and an alert with a lower priority is hidden in the overlapping area.

18. An obstacle indication system for an aircraft, the obstacle indication system comprising:

an addressable light bar comprising a plurality of light units and a driver;
a memory storing software instructions; and
a processor configured to execute the software instructions to thereby:
obtain a track list of a plurality of objects;
create an alert list of a plurality of alerts, each alert comprising a corresponding one of the plurality of objects;
determine, for each of the plurality of objects in the track list, an alert factor by determining a relative location with respect to the aircraft based on azimuth, wherein each of the plurality of alerts comprises the corresponding one of the plurality of objects and the corresponding alert factor and wherein at least one alert factor is a display brightness based on a range to the aircraft; and control the driver of the light bar to display the plurality of alerts.

19. The obstacle indication system according to claim 14, wherein the memory and the processor are disposed within a housing of the light bar.

20. The obstacle indication system according to claim 14, wherein the light bar comprises a single row of a plurality of light emitting diodes (LEDs).

21. The obstacle indication system according to claim 20, wherein the driver comprises an LED driver.

22. The obstacle indication system according to claim 14, wherein the track list of objects comprises, for each of the plurality of objects, a longitude, a latitude, and an altitude.

23. The obstacle indication system according to claim 18, wherein the alert factor is a display color, and the processor is configured to control the driver of the light bar to display the plurality of alerts according to the corresponding alert factor.

24. The obstacle indication system according to claim 15, wherein the processor is configured to determine the at least one alert factor by determining:

a color green based on a rate of closure to the aircraft being below a first rate threshold;
a color yellow based on the rate of closure being between the first rate threshold and a second rate threshold; and
a color red based on the rate of closure being higher than the second rate threshold,
wherein the second rate threshold is higher than the first rate threshold.

25. The obstacle indication system according to claim 15, wherein the at least one alert factor is a brightness.

26. The obstacle indication system according to claim 18, wherein the at least one alert factor is a display width.

27. The obstacle indication system according to claim 26, wherein the processor is configured to determine the alert factor by determining the display width as directly corresponding to the azimuth.

28. The obstacle indication system according to claim 26, wherein the processor is configured to determine the alert factor by determining one of:

a first display width based on the azimuth being less than an azimuth threshold; and
a second, variable, display width corresponding to the azimuth based on the azimuth being greater than the azimuth threshold.

29. The obstacle indication system according to claim 15, wherein the processor is configured to order the plurality of alerts in an order of priority by ordering the plurality of alerts by the at least one alert factor, and within each of a plurality of first alert factor categories, ordering one or more of the plurality of alerts based on a range of a corresponding object to the aircraft.

30. An obstacle indication system for an aircraft, the obstacle indication system comprising:

an addressable light bar extending over at least 90 degrees of an azimuth of a viewpoint of a pilot;
a memory storing software instructions; and
a processor configured to execute the software instructions to thereby:
obtain a track list of a plurality of objects;
create an alert list of a plurality of alerts, each alert comprising a one corresponding of the plurality of objects; and
control the light bar to display the plurality of alerts.

* * * * *